E. W. Johnson,
Reciprocating Saw Mill.
Nº 10,473.   Patented Jan. 31, 1854.
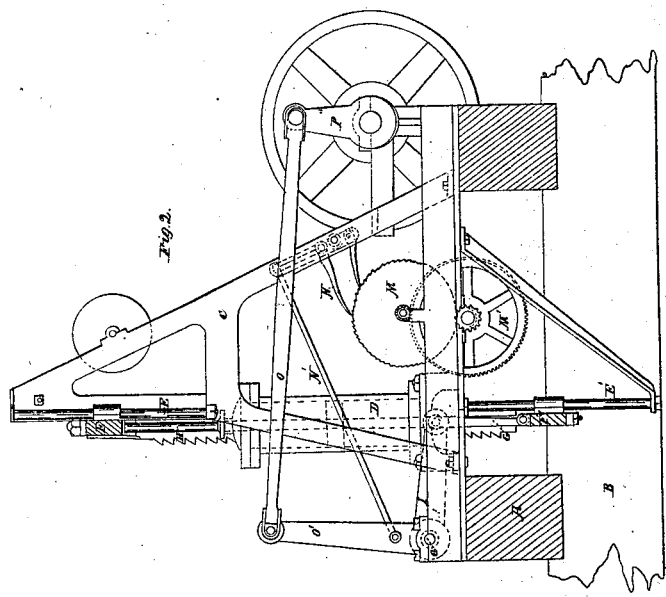
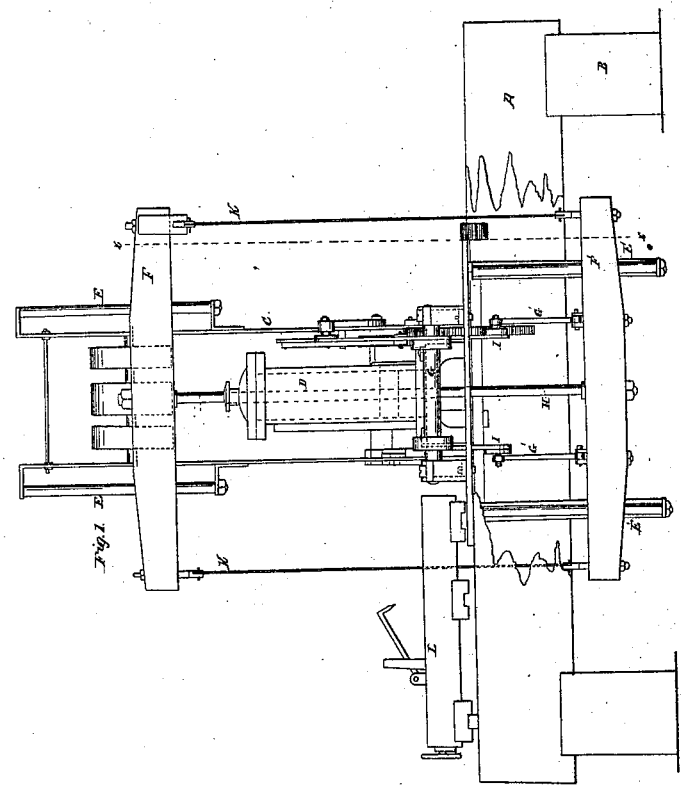

UNITED STATES PATENT OFFICE.

ELEAZER W. JOHNSON, OF PERTH AMBOY, NEW JERSEY.

SAWMILL.

Specification of Letters Patent No. 10,473, dated January 31, 1854.

*To all whom it may concern:*

Be it known that I, ELEAZER W. JOHNSON, of Perth Amboy, county of Middlesex, and State of New Jersey, have invented a new and useful Improvement in Sawmills; and I do hereby declare that the following is a full, clear, and exact description of the same, reference being made to the annexed drawings, making a part of this specification, in which—

Figure I is a front elevation; Fig. II, a section on the line $x$, $x$, of Fig. I, and similar letters refer to similar parts throughout.

My invention is for certain improvements in portable sawmills. The leading parts are the same as usually employed in ordinary sawmills.

The peculiar features consist in a new and better arrangement of the several parts and the manner of applying the motive power, which is intended to be steam. Instead of driving the saw by a train of belting, &c., I combine the piston rod directly with the saw gate in such way that single or gangs of saws may be operated on both sides of the cylinder which latter is placed directly within the center of the framing. To accomplish this the piston rod passes through both ends of the cylinder and takes hold of the cross head both above and below. In sawing however by such an arrangement unless the saws of both sides were kept continuously operating at the same time there would be a tendency to bear down unequally and risk the bending of the piston rod. This is prevented by a supplementary shaft placed in front and connected to the saw gate on each side of the cylinder, and this takes all the strain of torsion. The whole is placed on one bed plate, so that it can be set down in the woods and put to work without any further structure being erected. As will more fully appear from the following description of the manner of building and operating the mill.

At A, B, is a strong timber frame upon which the saw gate, carriages, &c., are erected. A gallows work of metal or other suitable material is set up at C between which there is a steam cylinder D placed so that its piston will play up and down in line with the front edge of the gallows frame where there are guide rods E upon which the upper cross head F of the saw gate plays. On the frame below the cylinder, the second cross head F' plays upon guide posts E' as shown. The piston rod H takes hold of F and F'.

At G is a strong shaft working in plumber blocks placed across the frame in front of the cylinder, and parallel to the cross head. It is connected to the lower cross head of the saw gate by two links G' depending from two arms I. Finally the saws are stretched to the gate in usual manner, as shown at K.

At L is the common carriage for holding and feeding up the log, there being one on each side.

M is the ratchet wheel and M' the large driver working in the rack upon the carriage.

The pawls N are operated by a rod reaching to a vibrating arm N' upon the shaft G, as shown.

O is a connecting rod leading from the arm O' upon the rock shaft G to the crank and fly wheel P for governing the motion of the machine.

Steam being applied to the cylinder the saw gate is set in motion and timber being placed upon the carriages the work goes on in the ordinary manner. In place of single saws as represented at K gangs may be set up as in the ordinary manner. The use of the torsion shaft G will now appear. During the time of running both saws it may happen that one side will sometimes finish soonest, thus leaving all the strain of the other saw to act without balance from the opposite side and hence unless some means were interposed the stability of the machine would be endangered by the bending the piston rod, &c. Now by reason of the connection of the cross shaft G with the lower cross head (the upper one would answer as well) any undue pressure upon one side is immediately transmitted to that shaft and by the opposite link the parallelism of the cross heads will be maintained. Thus each party of hands may continue to saw without any regard to the movements of the other the same as in the case of independent saw mills.

The great advantage of the above described arrangement for driving saws consists in its portability; the placing of the driving machinery upon a single bed plate affording the means for a facility of transportation altogether unknown to ordinary arrangements. By its use the mill can readily be carried from one location to another and put in operation in a few hours, or, if built for use in distant regions, it can be put together at the manufactory, and shipped in a condition to be set in operation immediately on arriving at its destination.

What I claim as of my own invention and desire to secure by Letters Patent is—

The arrangement of mechanism for driving two saws or gangs of saws and placing the whole upon one bed-plate, in the manner and for the purposes set forth.

ELEAZER W. JOHNSON.

Witnesses:
S. H. MAYNARD,
J. P. PIRSSON.